(12) United States Patent
Friederichs et al.

(10) Patent No.: US 6,454,513 B1
(45) Date of Patent: Sep. 24, 2002

(54) DEVICE COMPRISING TWO PARALLEL LINKAGE MECHANISMS

(75) Inventors: Paul Friederichs, HK Baarn; Andrianus Van Pinxteren, Eemnes, both of (NL)

(73) Assignee: FCI'S -Hertogenbosch B.V. (NL)

( * ) Notice: Subject to any disclaimer, the term of this patent is extended or adjusted under 35 U.S.C. 154(b) by 0 days.

(21) Appl. No.: 09/674,243
(22) PCT Filed: Apr. 29, 1998
(86) PCT No.: PCT/NL98/00239
§ 371 (c)(1), (2), (4) Date: Feb. 2, 2001
(87) PCT Pub. No.: WO99/55496
PCT Pub. Date: Nov. 4, 1999

(51) Int. Cl.[7] ................................. B66C 1/00
(52) U.S. Cl. ................. 414/729; 74/490.06; 901/29
(58) Field of Search ................. 414/729, 735; 901/28, 29; 74/490.06

(56) References Cited

U.S. PATENT DOCUMENTS

| | | | |
|---|---|---|---|
| 4,687,400 A | | 8/1987 | Lichti .................. 414/4 |
| 4,723,460 A | * | 2/1988 | Rosheim ............... 901/29 X |
| 5,190,333 A | | 3/1993 | Minichan et al. ...... 294/86.41 |
| 5,699,695 A | * | 12/1997 | Confield ............... 901/29 X |

FOREIGN PATENT DOCUMENTS

| | | |
|---|---|---|
| BE | 685466 | 1/1967 |
| GB | 1089559 | 11/1967 |

* cited by examiner

Primary Examiner—Donald W. Underwood
(74) Attorney, Agent, or Firm—Perman & Green, LLP

(57) ABSTRACT

Device comprising two linkage mechanisms each having at least three bars (B11, 21, 51) of which a first and a second bar with the same length extend parallel to each other and are pivotably interconnected by at least a third bar. The two first and two third bars of both mechanisms are pivotably connected at a common main pivot (MP). Hinge point (HP1, HP2) of the first bars lying away from the main pivot are independently movable along linear paths. The device is further provided with a tool (T) comprising the main pivot. The first and second bars of each mechanism are pivotably connected by a fourth bar (B41, 42), lying parallel to and having the same length as the third bar. The fourth bar is rotatable about the hinge point of the first bar. The pivot points (P231, P232) of the third and second bars of the first and second mechanisms are connected to the tool and a pant of the tool respectively, whereby rotating the fourth bar of the first mechanism around the hinge point causes a rotation of the tool around the main pivot and rotating the fourth bar of the second mechanism around the hinge point causes rotation of the part of the tool around the main pivot.

7 Claims, 9 Drawing Sheets

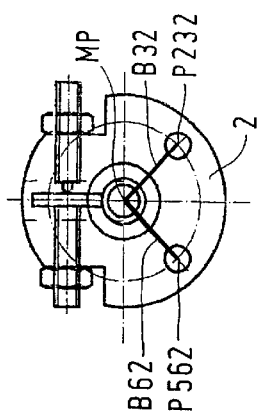
FIG. 3
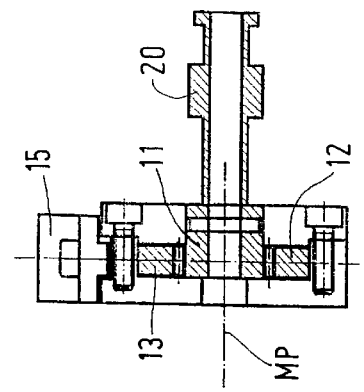
FIG. 4B
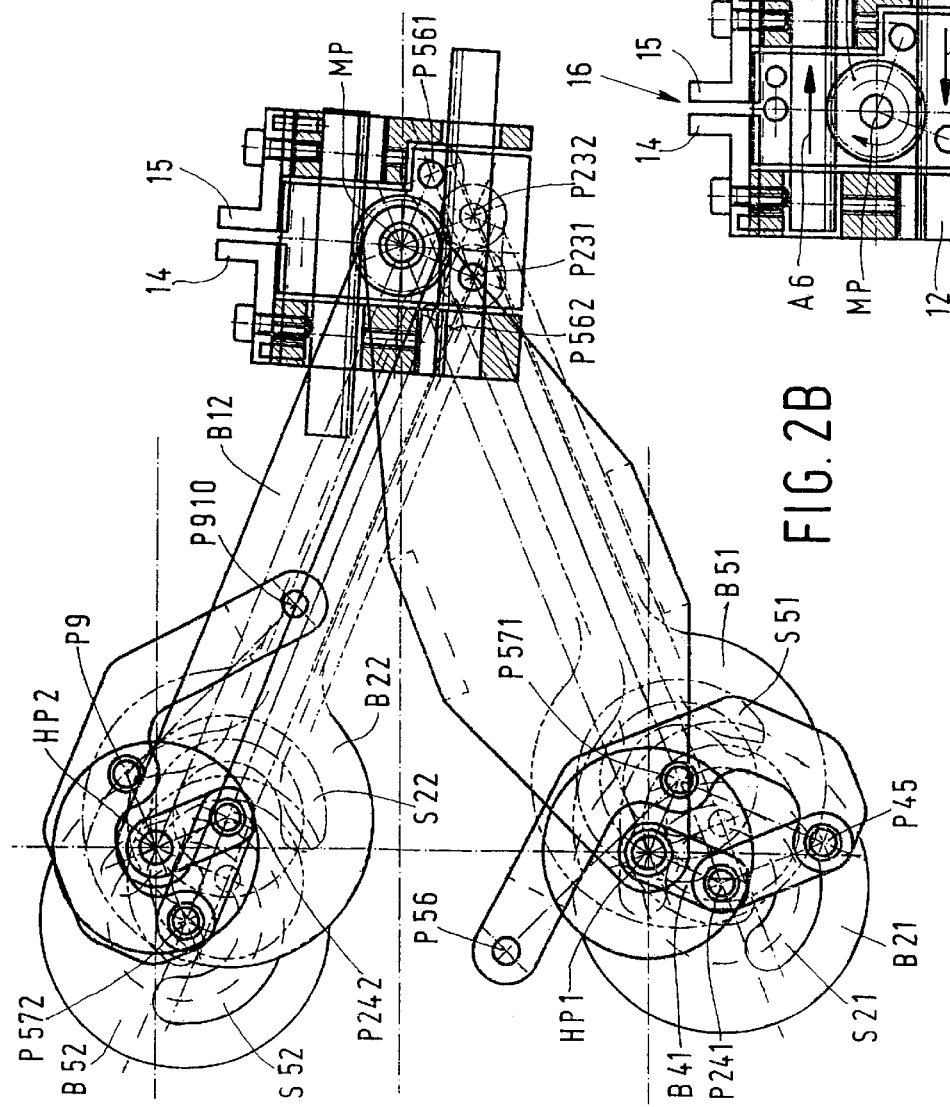
FIG. 2B
FIG. 4A

DEVICE COMPRISING TWO PARALLEL LINKAGE MECHANISMS

The invention relates to a device comprising two linkage mechanisms each having at least three bars of which a first and a second bar with the same length extend parallel to each other and are pivotably interconnected by at least a third bar, the two first and two third bars of both mechanisms are pivotably connected at a common main pivot, hinge points of the first bars lying away from the main pivot are independently movable along linear paths, the device is further provided with a tool comprising the main pivot.

By such a device which is known from U.S. Pat. No. 4,687,400 the tool comprises a gripper means having two claws. The main pivot is connected to both claws whilst at each claw one of the two pivots of the second and third bars are connected. By translating both hinge points in the same parallel vertical transport directions and over the same distance the tool is moved vertically. By translating only one of the hinge points the tool moves mainly in a horizontal direction. By moving at least one of the second bars, the claws of the gripper means are closed or opened.

The second bars are moved by translating the end of the second bars remote from the third bars in a vertical direction parallel to the transport direction of the hinge points of the first bars. Hereby the distance between said ends of the second bars and the hinge points change. This means that the first and second bars do not remain parallel, so that the control of the desired accurate movements is relatively complicated. Furthermore by the device according to U.S. Pat. No. 4,687,400 the tool cannot be rotated round the main pivot in order to rotate the object situated between the claws.

It is therefore an object of the present invention to provide a device whereby the tool cannot only be moved in at least two different directions but can also be rotated around the main pivot.

This object of the present invention is achieved in that the first and second bars of each mechanism are pivotably connected by a fourth bar, lying parallel to and having the same length as the third bar, the fourth bar is rotatable about the hinge point of the first bar, the pivot points of the third and second bars of the first and second mechanism are connected to the tool and a part of the tool respectively, whereby rotating the fourth bar of the first mechanism around the hinge point causes a rotation of the tool around the main pivot and rotating the fourth bar of the second mechanism around the hinge point causes rotation of the part of the tool around the main pivot.

In this patent application a bar should be considered as any connecting element which is pivotably connected between two pivots.

By rotating one of the fourth bars the tool as such is rotated whilst the part of the tool, for example the gripper means need not to be rotated with respect to the tool.

By moving the two hinge points and rotating the two fourth bars, the tool can be moved into/in two orthogonal directions, rotated round the main pivot and perform an additional feature, like opening or closing gripper means, rotating a gear connected to a manipulator and located in the tool etc.

An embodiment of the device according to the invention is characterized in that at least one linkage mechanism comprises a fifth bar lying parallel to and having the same length as the first bar, the first and fifth bar are pivotably connected by a sixth and seventh bar lying parallel to each other and having the same length, the sixth arm is pivotably connected to the first arm at the main pivot point and encloses an angle with the third arm.

In this manner the fourth bar can be rotated fully round the hinge point without having the risk that at the so called dead point, in which the third and fourth bar extends parallel to the first and second bar, the fourth bar continues to rotate in one direction whilst the third bar changes from the direction of rotation.

Another embodiment of the device according to the invention is characterized in that the fourth arm is pivotably connected to an angle doubling mechanism.

If at the input of the angle doubling mechanism a 90° rotation is performed, the fourth arm will rotate over 180°.

The device will further be explained with reference to the drawing, in which

FIGS. 2A–2B show plan views of the device as shown in FIG. 1 in a closed position of the gripper means;

FIG. 3 shows a plan view of a detail of the device of FIG. 1;

FIGS. 4A, 4B show respectively a plan view and side view of the gripper means of the device shown in FIG. 1;

FIGS. 9A–F show in three steps the rotation of the tool round the main pivot;

FIGS. 10A–E show several movements of the device according to the invention.

Alike parts are numbered alike through the figures whereby bars are indicated by a B followed by a number, pivot points are indicated by a P followed by a number except for the hinge points HP1, HP2 and the main pivot MP, and slots in the bars are indicated by S followed by a number. For example pivot P231 means the pivot P between bar B21 and bar B31 of linkage mechanism M1 (see FIG. 8).

Figure 1:
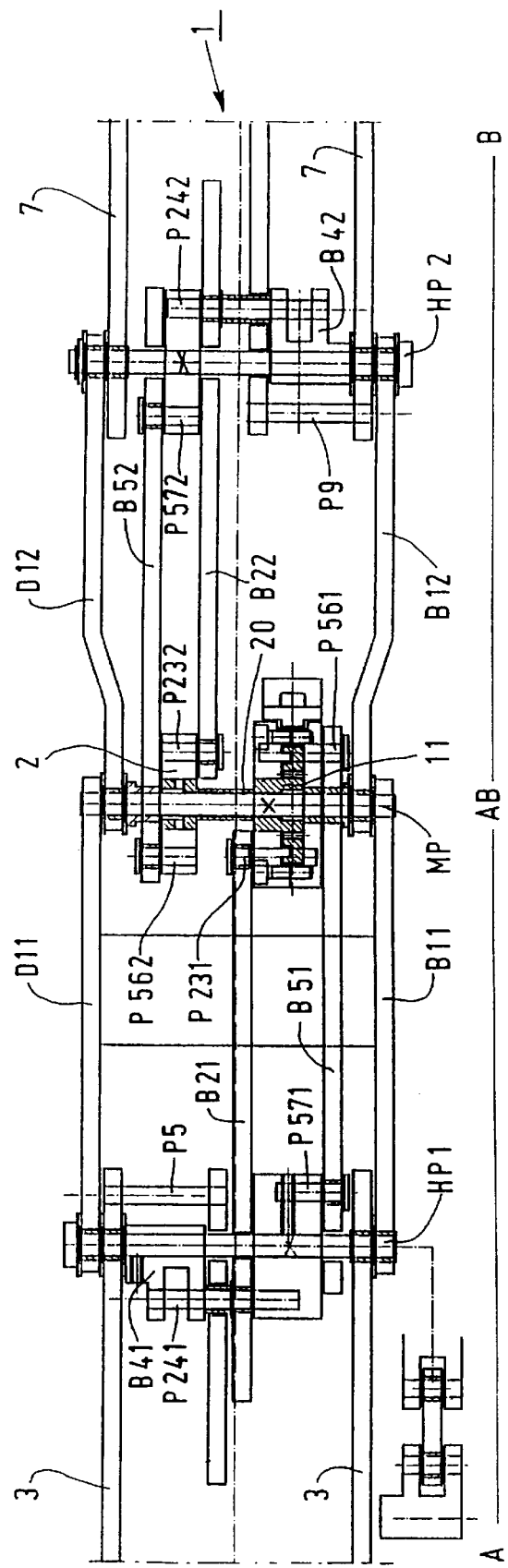
FIG. 1 shows a side view along the lines A—AB—B in FIG. 2A of a device according to the present invention.
Figure 2A:
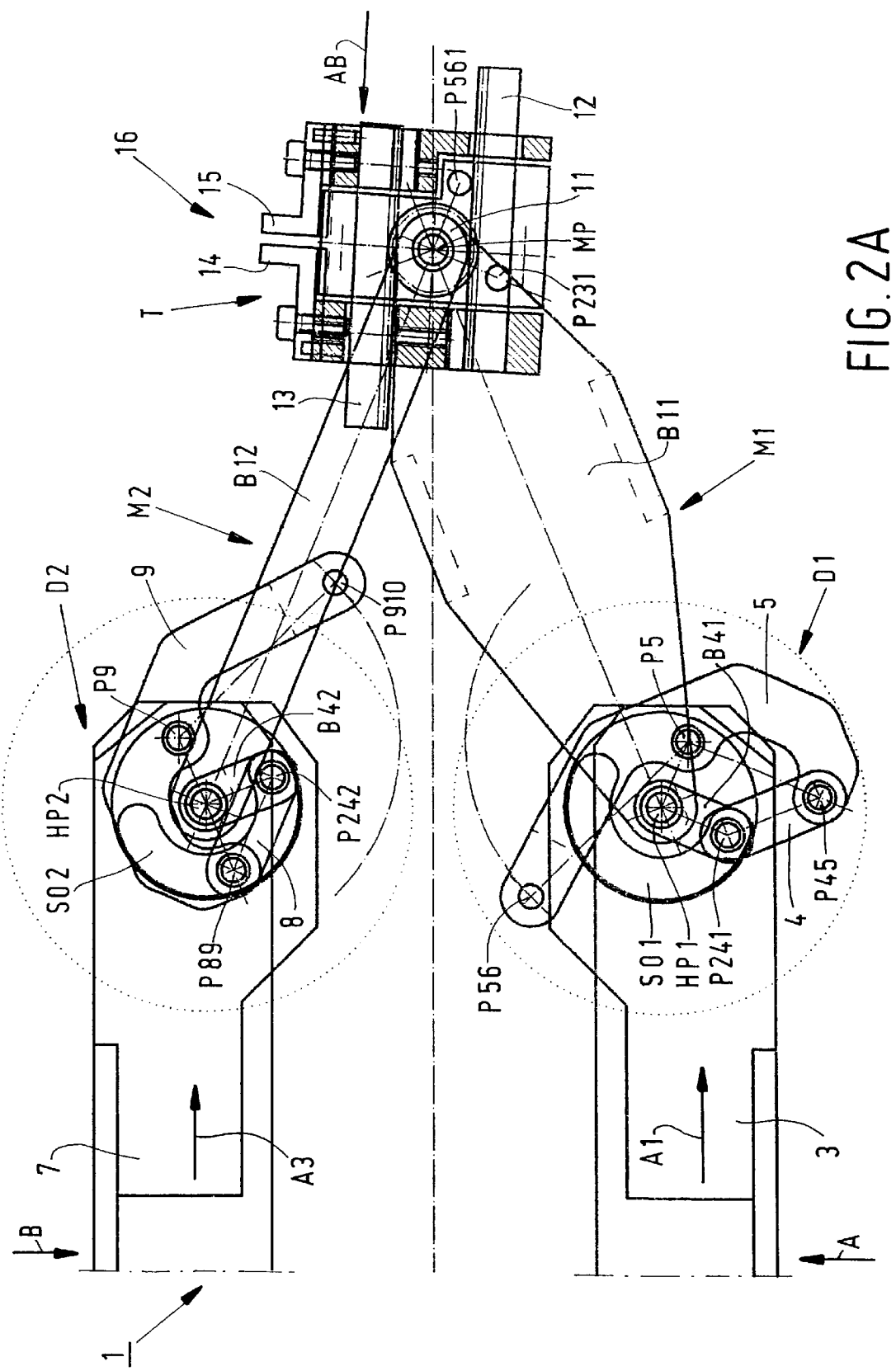

FIGS. 1, 2A and 2B show a device 1 according to the invention comprising two linkage mechanisms M1, M2, two angle doubling mechanisms D1, D2 and one tool T. Each linkage mechanism M1, M2 comprises a main bar B11, B12 which is pivotable connected to the pivots HP1, MP and HP2, MP. Referring to FIG. 1, the linkage mechanism M1, M2 can also include main bars D11, D12 which are pivotable connected to the pivots HP1, MP and HP2, MP on a side of each mechanism M1, M2, opposite bars B11, B12. The pivot MP is a common pivot of both mechanisms M1, M2 and is called the main pivot MP. This pivot MP is located on the tool T.

The linkage mechanism M1 comprises two bars B21, B51 which extend parallel to the first bar B11 and have the same length as the bar B11. The relevant length of a bar is determined by the distance between the pivots at the respective ends of a bar.

The bars B11 and B21 are interconnected by third and fourth bars B31 and B41. The bar B31 is formed by the distance between the pivot points P231 and MP.

The fifth bar B51 is pivotably connected to the bar B11 by bars B61 and B71.

The bar B71 is determined by the fixed distance between the hinge points HP1 and the pivot point P571.

The second mechanism M2 is similar to linkage mechanism M1 and comprises bar B22, B32, B42, B52, B62, B72 which are pivotably connected to each other in the same way as the bars of linkage mechanism M1. The bar B32 is formed by the distance between two pivot points MP, P232 on the disc 2 as shown in FIG. 3. The bar B62 is formed by the distance between the main pivot MP and the pivot point P562 on disc 2.

The hinge point HP1 of linkage mechanism M1 is located on a slide 3 which is movable by a linear motor in the direction indicated by arrow A1. Near the end of the slide 3 a angular slot S01 is provided which is located around the hinge point HP1. Through the slot S01 a pin extends which forms the pivot P241. Connected to said pivot P241 is a link 4 which has a length of √2 times the distance between P241 and HP1. Said link 4 is pivotably connected at pivot P45 to a lever 5 which is pivotable around a fixed pivot P5. The distance between pivot P5 and the hinge point HP1 is the same as the distance between the hinge point HP1 and the pivot P241. The distance between P5 and P45 is twice said distance. The lever 5 is at an end remote from the pivot P45 provided with a pivot P56 by which it is connected to a rod 6 (see FIG. 6) which is movable by linear motor in the direction indicated by arrow A2 and parallel to A1. The lever 5, and the link 4 form the angle doubling mechanism D1.

In the same way hinge point HP2 is located on a slide 7 which is movable by a linear motor in the direction indicated by arrow A3. Near the end of the slide 7 a angular slot S02 is provided which is located around the hinge point HP2. Through the slot S02 a pin extends which forms the pivot P242. Connected to said pivot P242 is a link 8 which has a length of √2 times the distance between P242 and HP2 which is pivotably connected at pivot P89 to a lever 9 which is pivotable around a fixed pivot P9. The distance between pivot P9 and the hinge point HP2 is the same as the distance between the hinge point HP2 and the pivot P242. The distance between P9 and P89 is twice said distance. The lever 9 is at an end remote from the pivot P89 provided with a pivot P910 by which it is connected to a rod 10 (see FIG. 6) which is movable by linear motor in the direction indicated by arrow A4 and parallel to A3. The lever 9, and the link 8 form the angle doubling mechanism D2.

The tool T is provided with a gear 11 which is rotatable around the main pivot MP to which gear 11 the pivot points P232 and P562 are connected via the coupling piece 20 and disc 2 (FIG. 1).

The tool T is further provided with two racks 12, 13 lying on opposite sides of gear 11 and connected to the left and right claw 14, 15 respectively of the gripper means 16. The space between the claws 14, 15 is required for the components to be picked up.

The bars B21, B51, B22, B52 are near the hinge points HP1, HP2 provided with slots S21, S51, S22, S52 respectively located around the pivot points P241, P571, P242, P571 respectively through which a pin forming the hinge point HP1, HP2 extends. The angle over which the slots extend depends on the angle over which the tool T and the gear 11 need to be rotated. In the device as shown the slots extend over 180° so that the tool T and gear 11 can be rotated also 180°.

The working of the device 1 will be explained in a few steps with reference to the FIGS. 5–8.

Figure 5:
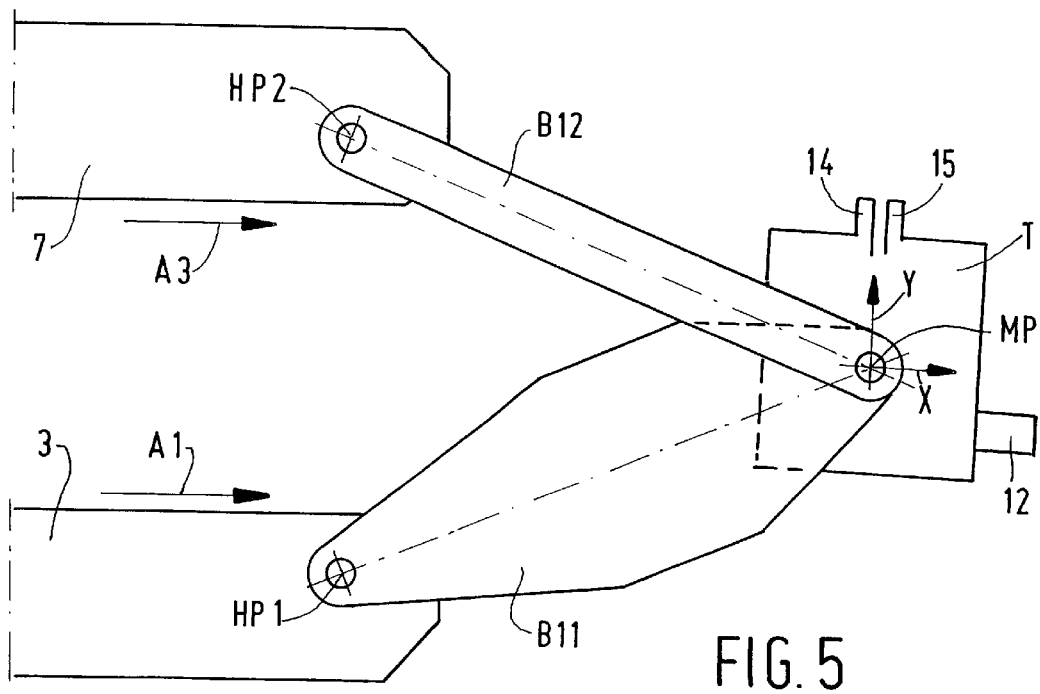
FIG. 5 shows a schematic view of a part of the device as shown in FIG. 1 by which the movement of the tool is performed.

In FIG. 5 those parts of the device 1 are schematically shown which are relevant for the displacement of the tool T into the direction indicated by arrows X, Y.

By moving the slides 3 and 7 in the directions indicated by the arrows A1, A3 over the same distance, the tool T will be moved over the same distance in the direction indicated by arrow X. If only slide 3 is translated in the direction indicated by arrow A1 the tool T will be translated mainly in the direction indicated by arrow Y. In fact the bar B12 will get rotated around hinge point HP2 due to which the main pivot MP of the tool T will also perform a slight displacement in the direction indicated by arrow X. By controlling the displacements of the slides 3, 7 into the directions indicated by arrows A1, A3 the main pivot MP of the tool T can be moved into any desired position.

Figure 6:
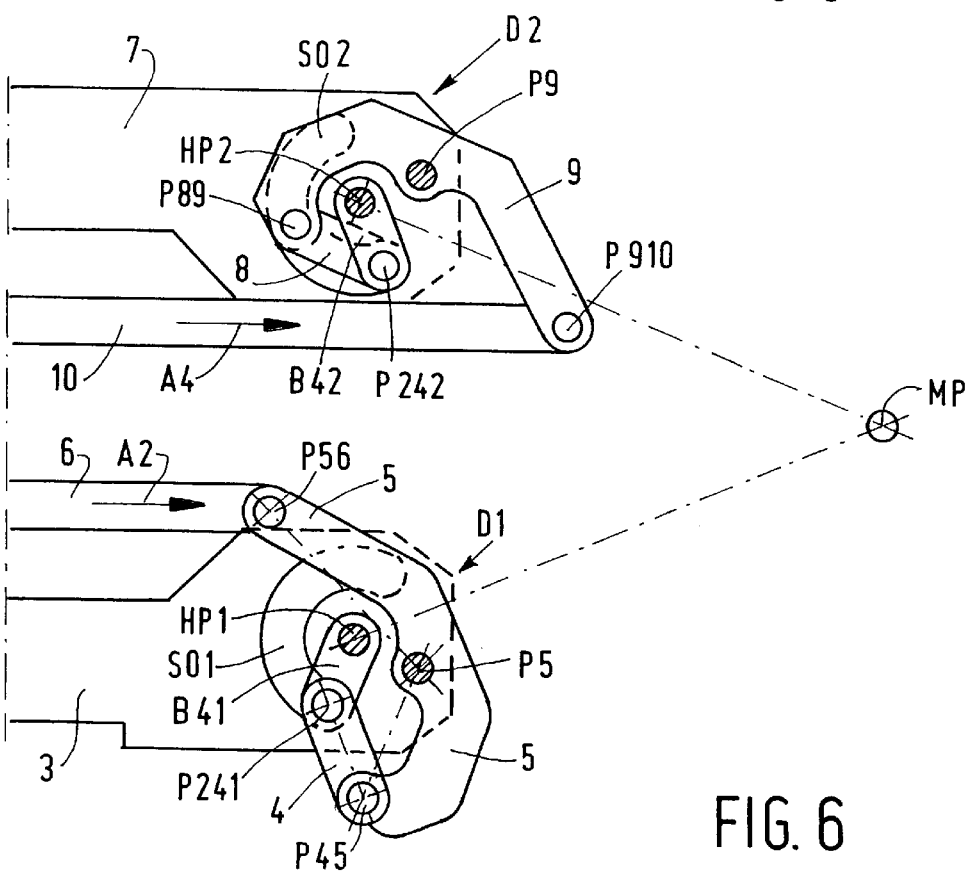
FIG. 6 shows a schematic view of the device as shown in FIG. 1 in which the angle doubling mechanism is shown.

From FIG. 6 the working of the angle doubling mechanism D1, D2 can be understood. By translating the rod 6 into the direction indicated by the arrow A2 the lever 5 will get rotated over, for example 90°. The link 4 which is pivotably connected by pivot P45 to link 5 will be displaced whereby the pivot P241 will get rotated around HP1 over 180°. This final position is depicted in mirror image by the angle doubling mechanism D2. The reason for the doubling of the angle from the link 5 onto the bar B41 is caused by the chosen relationship between the distances of the pivot points HP1, P241, P5, P45 of the angle doubling mechanism. The distances P5-HP1 being equal to HP1-P241 and the distance P5-P45 being twice said distance and the distance P241-P45 being √2 times said distance.

Figure 7:
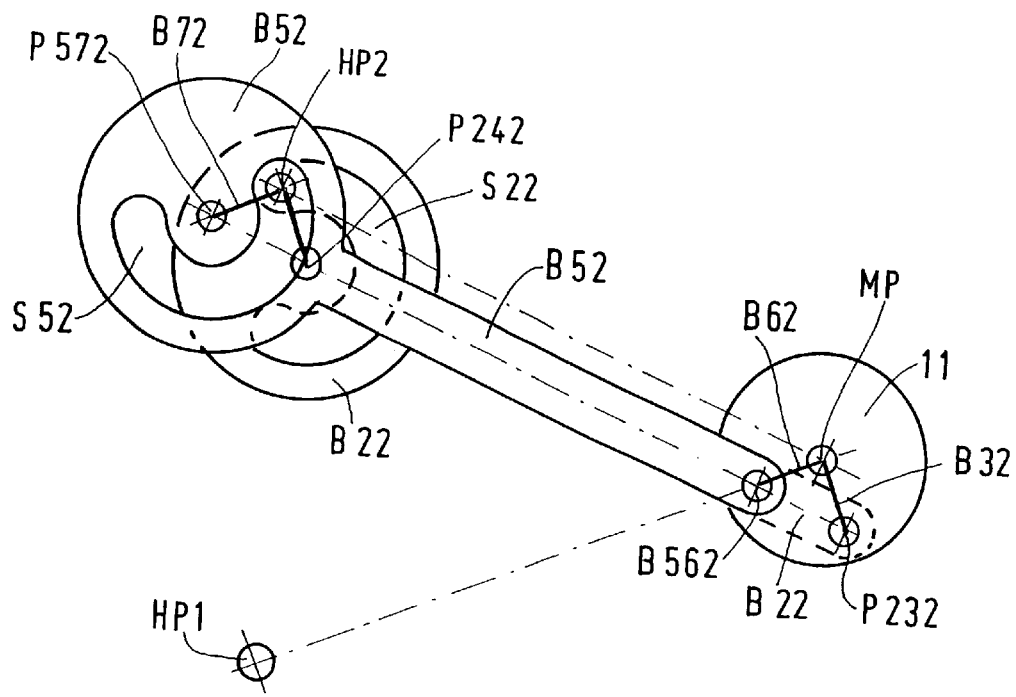
FIG. 7 shows a schematic view of a part of the device shown in FIG. 1 by which the rotation of a gear of the tool is performed.

FIG. 7 shows how the gear 11 can be rotated. The bar B42 is rotated by the angle doubling mechanism D2, around the hinge point HP2. Because the rods B12, B22, B42, B32 form a parallelogram mechanism bar B32 will perform the same rotation as bar B42. By rotating bar B32 around MP the gear 11 will also get rotated due to which the bar B62 will also perform said rotation and the bar B72 will perform the same rotation around hinge point HP2.

Figure 8:
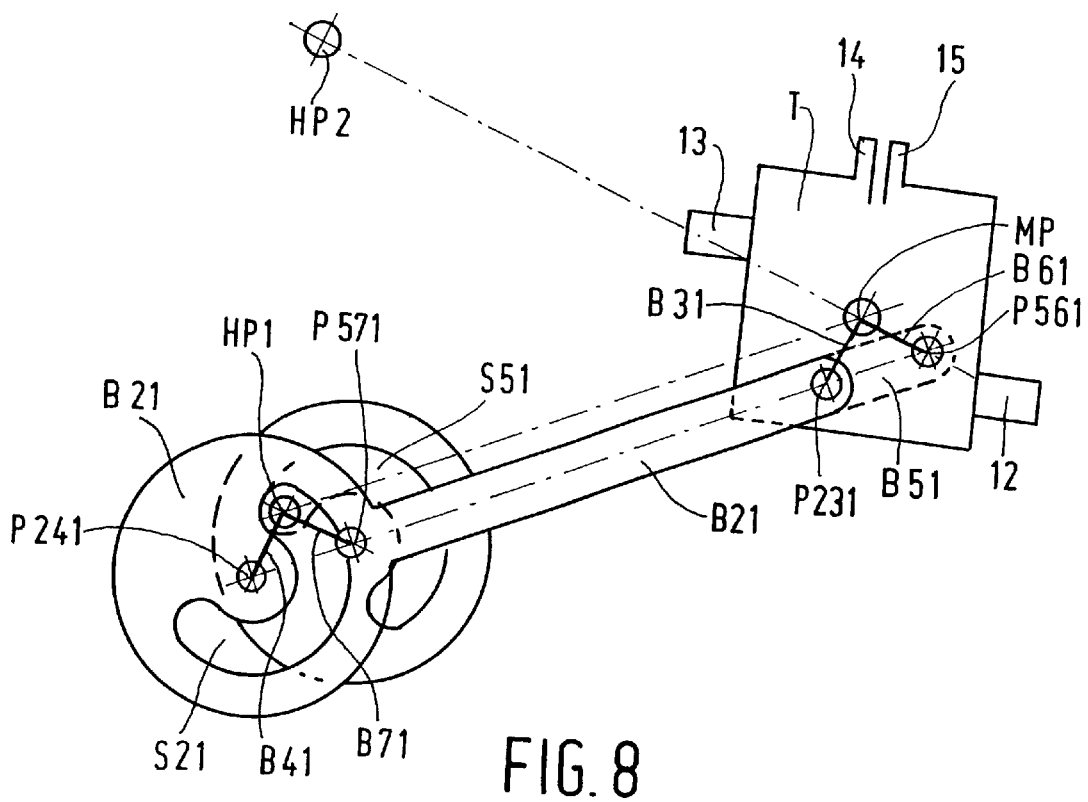
FIG. 8 shows a schematic view of a part of the device as shown in FIG. 1 by which the rotation of the tool around the main pivot is performed.

In FIG. 8 only the relevant part for the rotation of the tool T as a whole around main pivot MP is shown. By rotating the bar B41 around hinge point HP1 the bar B31 will perform the same rotation around main pivot MP. Since pivot P231 is connected to tool T also tool T will perform this rotation. By rotating the tool T also bar B61 will get rotated.

Figure 9A:
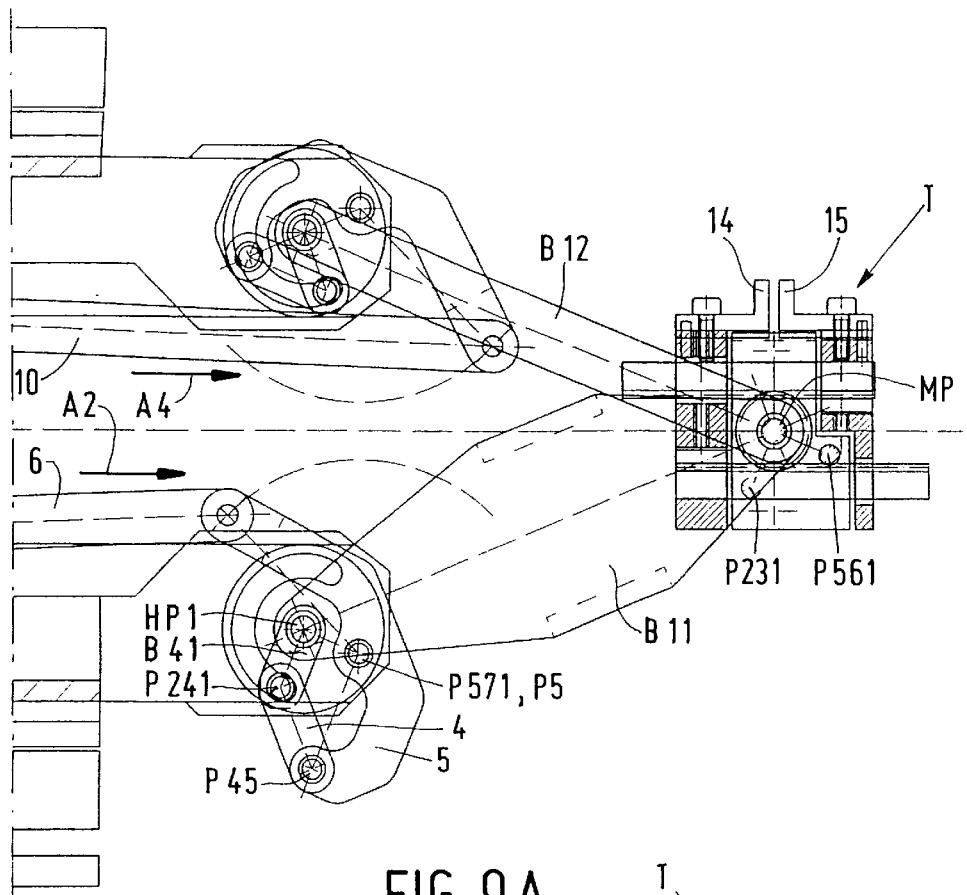
Figure 9B:
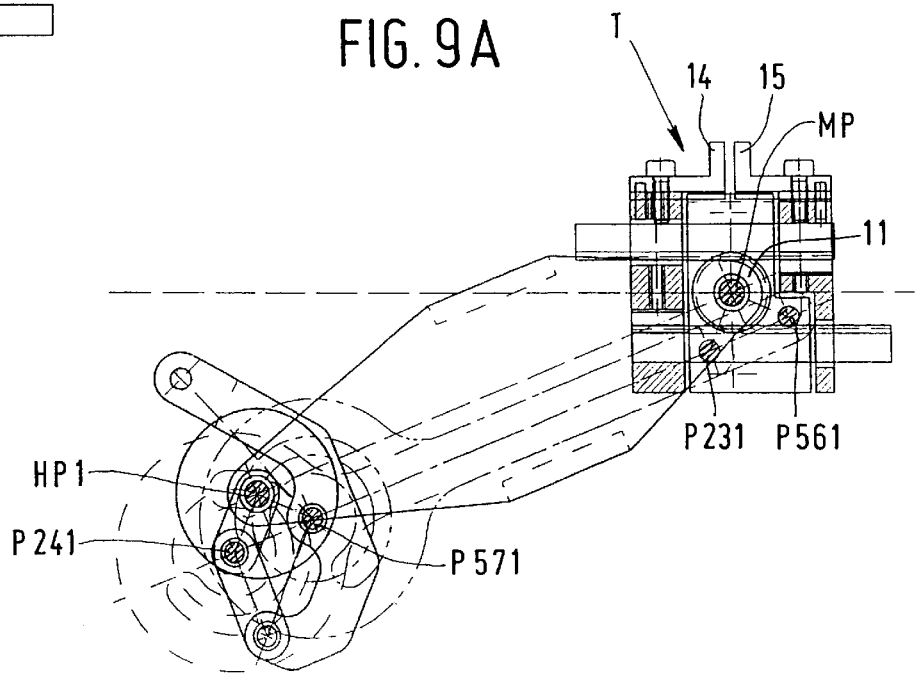
Figure 9C:
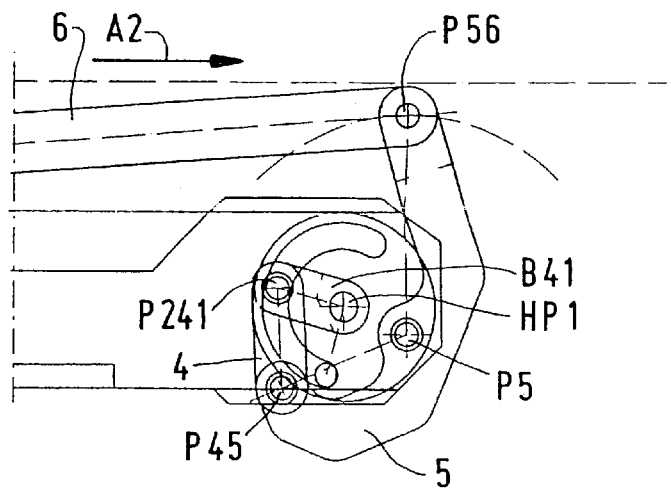
Figure 9D:
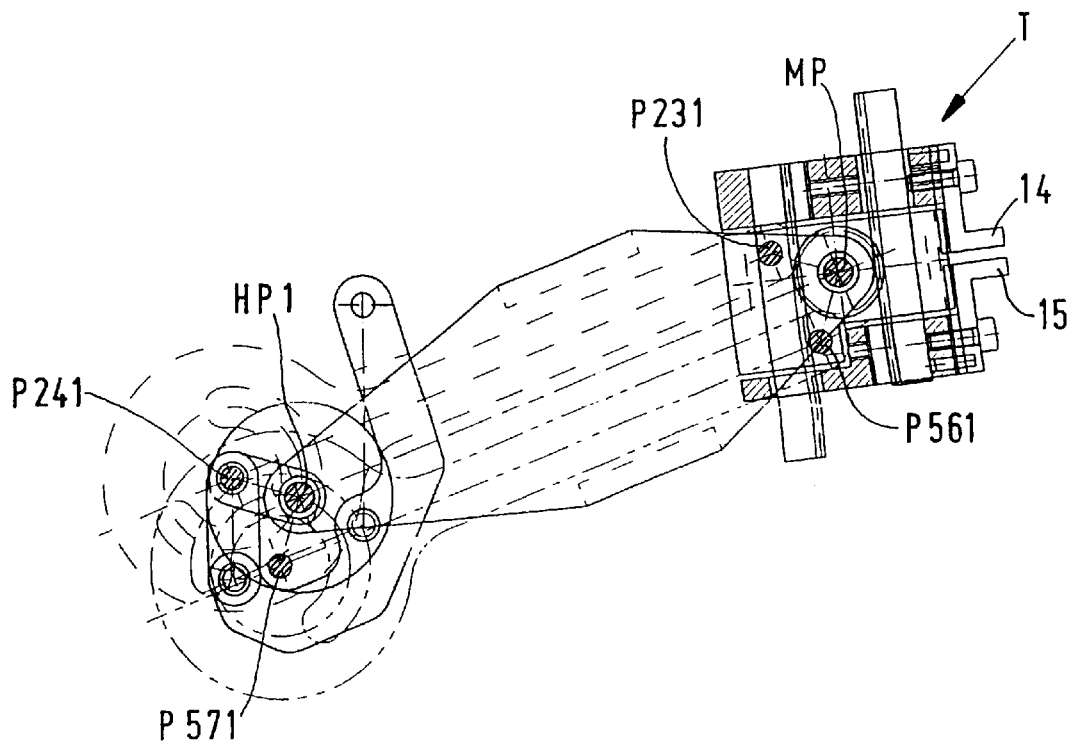
Figure 9E:
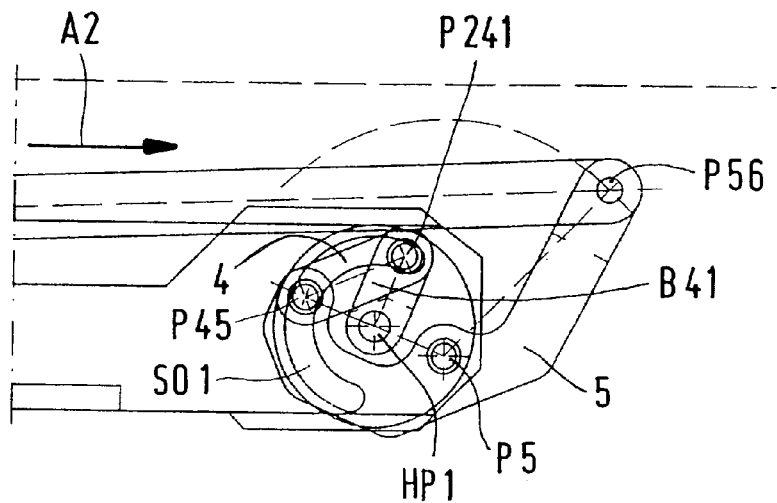
Figure 9F:
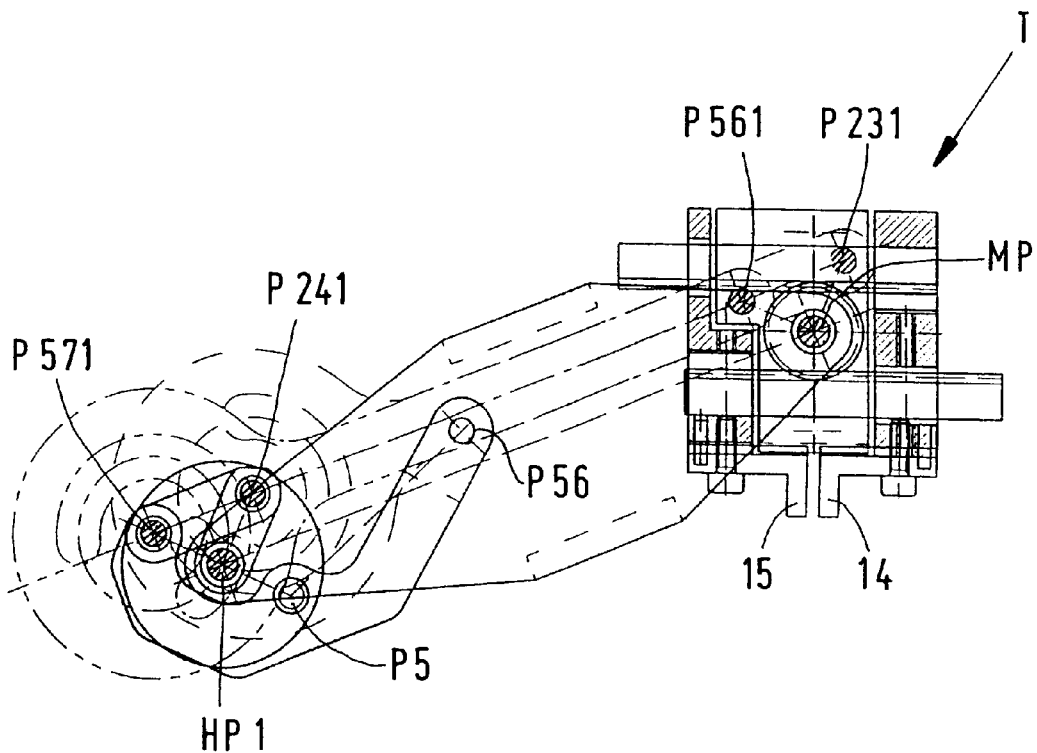

FIGS. 9A–9F show in three steps the rotation of the tool T from a position in which the claws 14, 15 are directed upwardly (FIGS. 9A,9B) via a position in which the lever 5 is rotated over 45° whilst the bar B41 is rotated over 90° and the claws 14, 15 are directed to the right (FIGS. 9C, 9D) to a position in which the lever 5 is rotated over 90° whilst the bar B41 is rotated over 180° and the claws 14, 15 of the tool T are directed downwardly (FIGS. 9E, 9F). Since the gear 11 located in the tool T is rotated together with the tool T around the main pivot MP the bars of the second linkage mechanism M2 must perform the same rotation. This means that during the translation of the rod 6 in the direction indicated by arrow A2 to perform the rotation of the tool T also the rod 10 must be translated in the direction indicated by arrow A4 over the same distance.

If only the rod 10 is translated into the direction indicated by arrow A4 the gear 11 will get rotated with respect to the tool T causing the racks 12, 13 to be displaced in the directions indicated by arrows A5, A6 (FIG. 4A) due to which the claws 14, 15 connected to the racks 12, 13 are moved apart.

FIGS. 10A–10E show five different positions of the tool T and the claws 14, 15 located therein.

Figure 10E:
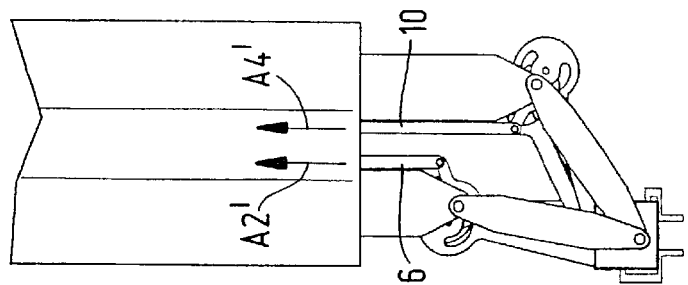
Figure 10D:
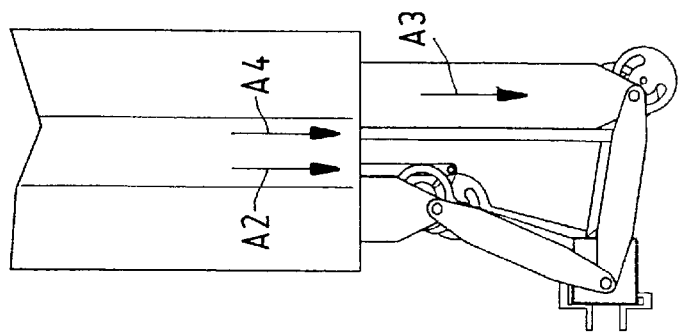
Figure 10C:
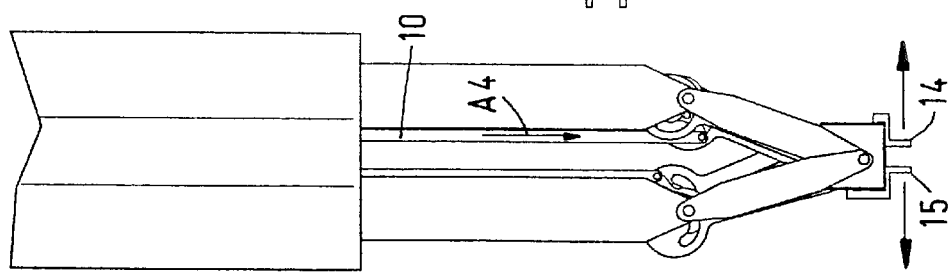
Figure 10B:
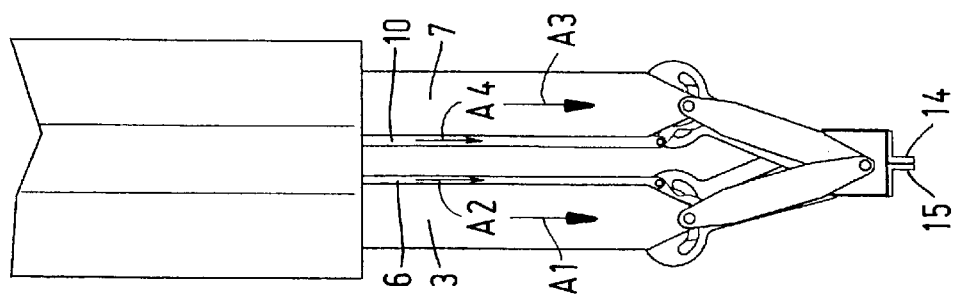
Figure 10A:
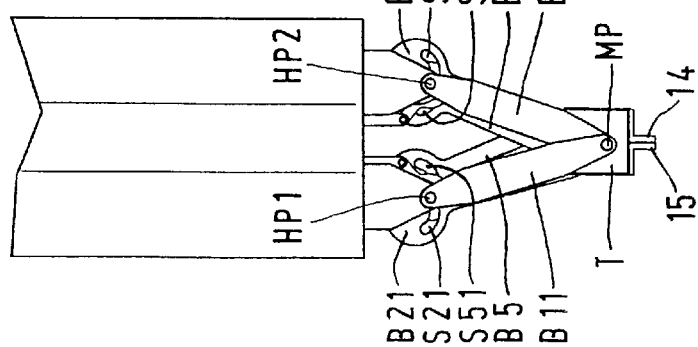

Starting from the position as shown in FIG. 10A the position as shown in FIG. 10B can be obtained by translating the slides 3, 7 and the rods 6, 10 over the same distance in the directions indicated by arrows A1–A4.

Starting from the position as shown in FIG. 10B the position as shown in figure 10C can be obtained by displacing only the rod 10 in the direction as indicated by arrow A4.

Starting from the position as shown in FIG. 10A the position as shown in figure 10D can be obtained by a controlled displacement of the rods 6, 10 and the slide 7 in the directions as indicated by arrows A2, A4, A3 respectively.

Starting from the situation as shown in figure 10D the situation as shown in FIG. 10E can be obtained by displacing the rods 6, 10 along the same distance in the direction indicated by the arrows A2', A4'.

Instead of gripping means 16 other manipulators or devices can be connected to the gear 11, like means for cutting, bending, soldering, engraving, measuring etc.

By the device as shown the slides 3, 7 are movable along parallel linear paths. It is, however, also possible to move the slides for example perpendicular to each other whereby the same movements of the tool and gripper can be realised.

What is claimed is:

1. Device comprising two linkage mechanisms each having at least three bars of which a first and a second bar with the same length extend parallel to each other and are pivotably interconnected by at least a third bar, the two first and two third bars of both mechanisms are pivotably connected at a common main pivot, hinge points of the first bars lying away from the main pivot are independently movable along linear paths, the device is further provided with a tool comprising the main pivot, characterized in that the first and second bars of each mechanism are pivotably connected by a fourth bar, lying parallel to and having the same length as the third bar, the fourth bar is rotatable about the hinge point of the first bar, the pivot points of the third and second bars of the first and second mechanism are connected to the tool and a part of the tool respectively, whereby rotating the fourth bar of the first mechanism around the hinge point causes a rotation of the tool around the main pivot and rotating the fourth bar of the second mechanism around the hinge point causes rotation of the part of the tool around the main pivot.

2. Device according to claim 1, characterized in that at least one linkage mechanism comprises a fifth bar lying parallel to and having the same length as the first bar, the first and fifth bar are pivotabley connected by a sixth and seventh bar lying parallel to each other and having the same length, the sixth bar is pivotabley connected to the first bar at the main pivot point and encloses an angle with the third bar.

3. Device according to claim 1, characterized in that the fourth bar is pivotable connected to an angle doubling mechanism.

4. Device according to claim 3, characterized in that said angle doubling mechanism comprises an arm which is at one end pivotable about a pivot and at the other end pivotably connected to a link which is pivotably being connected to the fourth bar at distance from the hinge point which is equal to the distance between said hinge point and the pivot of the arm, the arm having a length of twice said distance and the link having a length of $\sqrt{2}$ times said distance.

5. Device according to claim 1, characterized in that said part of said tool comprises a gear.

6. Device according to claim 5, characterized in that said tool comprises a gripping means having two claws which are each provided with a rack, said racks are linearly driven by said gear into opposite directions.

7. Device according to claim 6, characterized in that by rotating both fourth bars over the same angle a rotation of the tool is obtained, while by rotating the fourth bars over a different angle also an opening or closing of the gripping means is obtained.

* * * * *